Dec. 3, 1946.   M. RICKLAND   2,412,009
APPARATUS FOR HANDLING VEHICLES
Filed Dec. 26, 1944   5 Sheets-Sheet 1
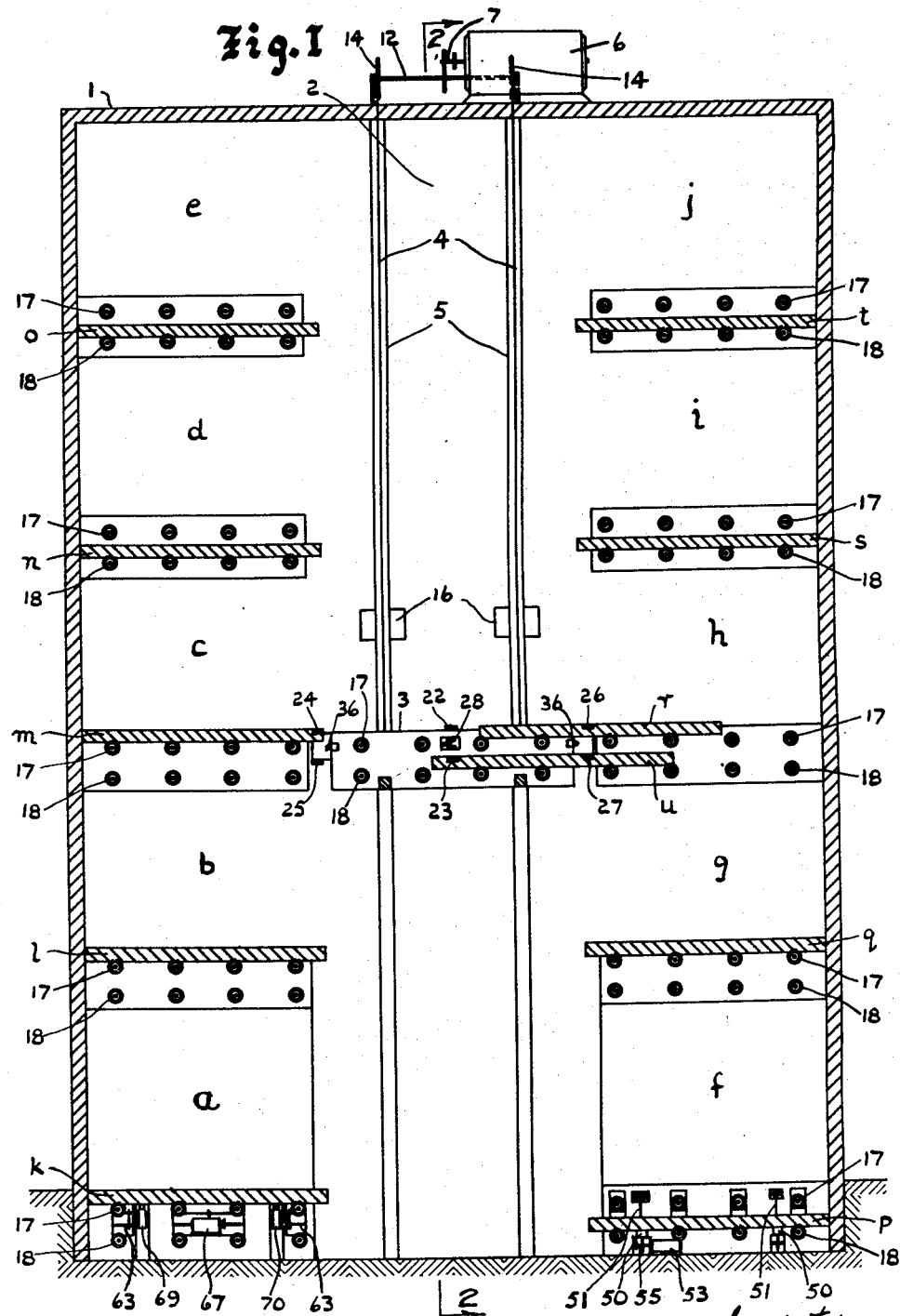

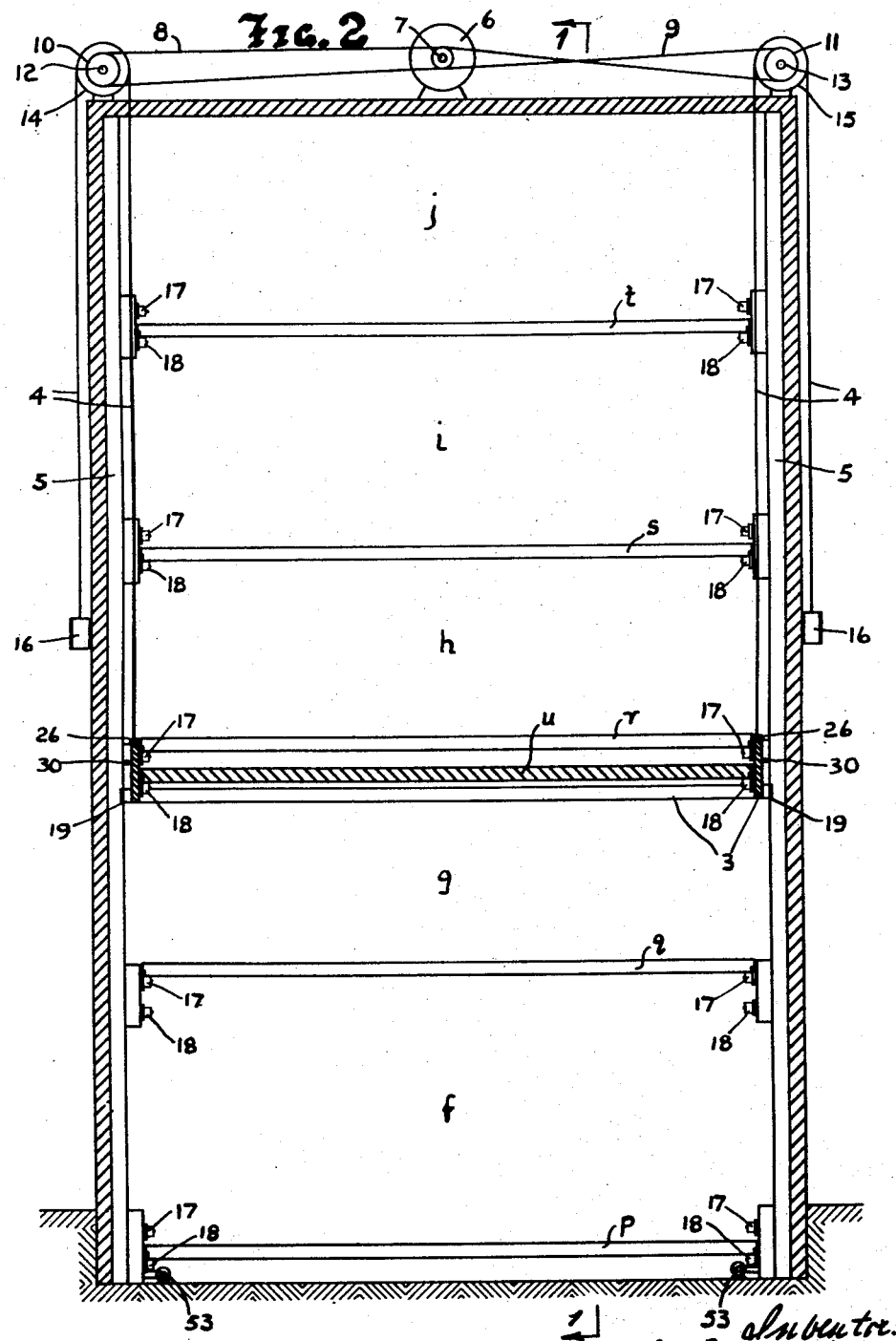

Dec. 3, 1946.  M. RICKLAND  2,412,009
APPARATUS FOR HANDLING VEHICLES
Filed Dec. 26, 1944   5 Sheets-Sheet 3
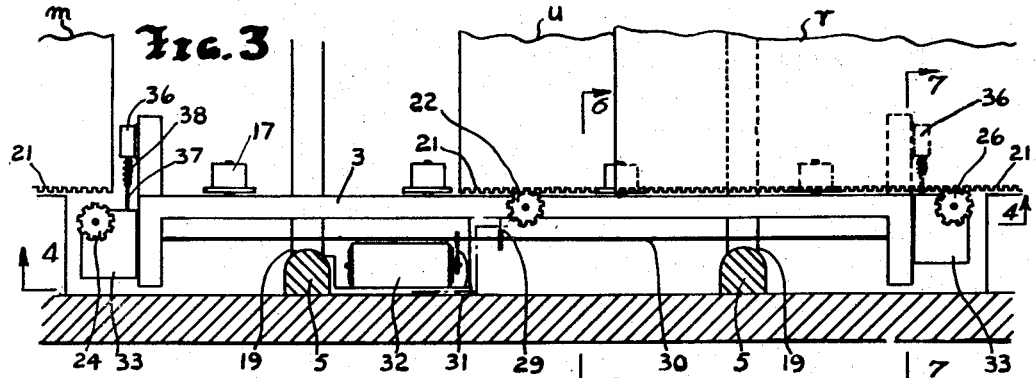
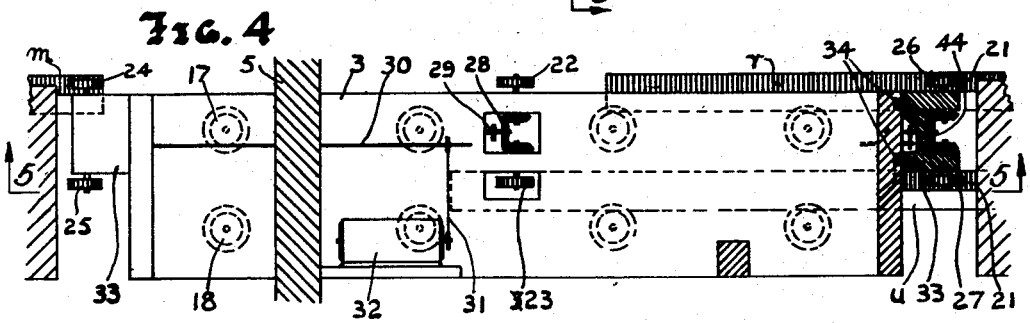
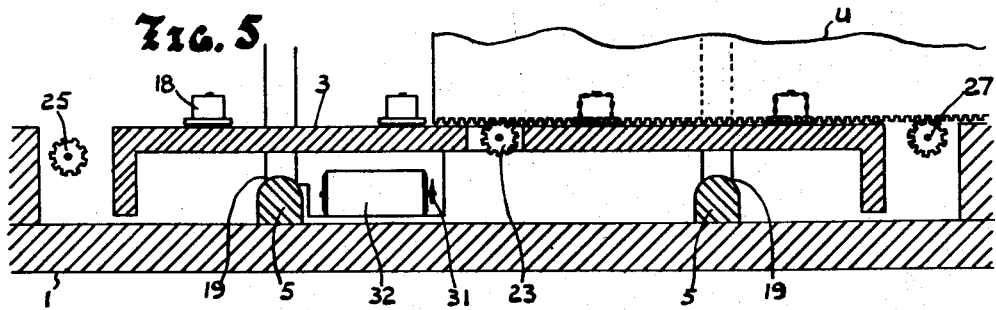
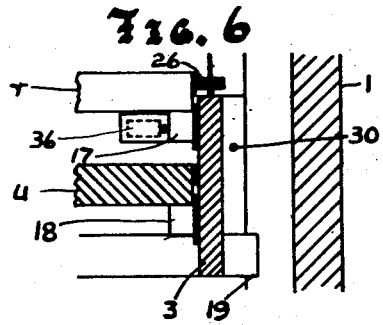
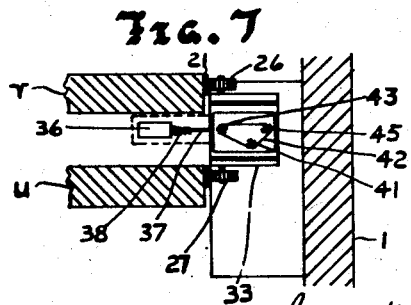

Dec. 3, 1946.     M. RICKLAND     2,412,009
APPARATUS FOR HANDLING VEHICLES
Filed Dec. 26, 1944     5 Sheets-Sheet 5

Inventor:
M. Rickland
By C. F. Okenroth
Atty

Patented Dec. 3, 1946

2,412,009

UNITED STATES PATENT OFFICE 2,412,009

APPARATUS FOR HANDLING VEHICLES

Martin Rickland, Durban, Natal, Union of South Africa

Application December 26, 1944, Serial No. 569,880
In the Union of South Africa January 13, 1944

6 Claims. (Cl. 214—16.1)

This invention relates to apparatus for accommodating and handling vehicles and other loads in, and with respect to, predetermined positions in a structure, e. g. a garage.

The object of the invention is to enable a maximum number of vehicles or other loads to be parked or accommodated in predetermined positions within a given compass, in a manner permitting them to be conveniently and expeditiously handled, i. e. received, stored and delivered, or transferred, as required.

According to the invention, apparatus of the type stated comprises one or more series of parking or accommodation compartments constituted within a framework or structure, and parking or accommodation platforms adapted to be supported above or adjacent to one another at predetermined levels or positions, so as to constitute movable floors for the said compartments, including one or more of these latter used as receiving and/or delivery compartments. A transfer shaft is provided in adjacency to the one or more series of compartments and accessible to any of the platforms or floors thereof. The invention further provides a hoist or conveyor, means for moving this hoist or conveyor within the transfer shaft to the level of, or into alignment with, any of the aforesaid compartments, and means for moving any of the platforms out of its compartment on to the said hoist or conveyor, and replacing the said platform by a platform brought to the said compartment by the hoist or conveyor. Alternatively, the last-named means may move a platform off the hoist or conveyor into a compartment and take on to the hoist or conveyor the platform previously constituting the floor of that compartment.

More specifically, apparatus of the type stated comprises, in combination, a series of parking or accommodation compartments, a hoist or conveyor, and movable platforms adapted to constitute the floors of the respective compartments and the hoist or conveyor. An upper set of supporting rollers or the like is provided for the platform or floor of each compartment and the hoist or conveyor, and a lower set of supporting rollers or the like is provided for the platform of each compartment and the hoist or conveyor. Means is provided for transferring the platforms of a compartment constituting a receiving compartment from their lower set of rollers or the like to their upper set of rollers or the like, and means is provided for transferring the platforms of a compartment constituting a delivery compartment from their upper set of rollers or the like to their lower set of rollers or the like or vice versa. The invention also comprises means for moving the hoist or conveyor so that its upper and lower sets of rollers or the like are on a level or in alignment with the upper and lower sets of rollers or the like of any of the compartments, and means whereby, when the hoist or conveyor is so positioned, a platform can be transferred from the lower or upper rollers or the like of the hoist or conveyor on to the lower or upper rollers or the like of the adjacent compartment or compartments or, alternatively, a platform transferred from the upper or lower rollers or the like of the said compartment or compartments on to the upper or lower rollers or the like of the hoist or conveyor.

Preferably, the several means for moving the hoist or conveyor and for lifting or lowering and transferring the platforms as aforesaid are operated by electric motors or other electrical means, controlled from a single control point, situated at or near the level or place of reception and delivery of the vehicles or other loads.

An apparatus embodying the invention will now be described, by way of example, with reference to the accompanying drawings, in which:

Fig. 1 is a view of the apparatus in front sectional elevation.

Fig. 2 is a sectional elevation of the apparatus taken in the plane of the line 2—2 (Fig. 1).

Fig. 3 is a plan view of the means for transferring the platforms from the hoist to the compartments or vice versa.

Fig. 4 is a sectional elevation of the said means taken on the line 4—4 (Fig. 3).

Fig. 5 is a sectional plan view taken on the line 5—5 (Fig. 4).

Fig. 6 is a sectional elevation taken on the line 6—6 (Fig. 3).

Fig. 7 is a sectional elevation taken on the line 7—7 (Fig. 3).

Figure 8:
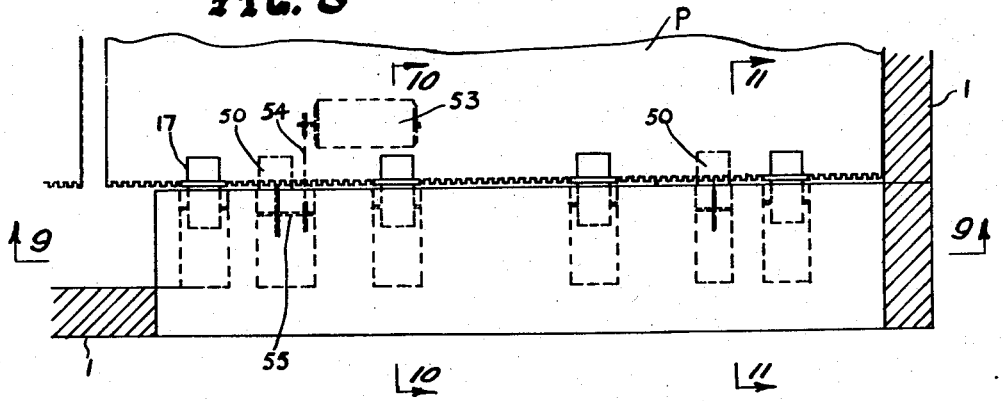
Fig. 8 is a plan view of the means for lifting a platform from the lower set to the upper set of rollers at the receiving compartment.
Figure 9:
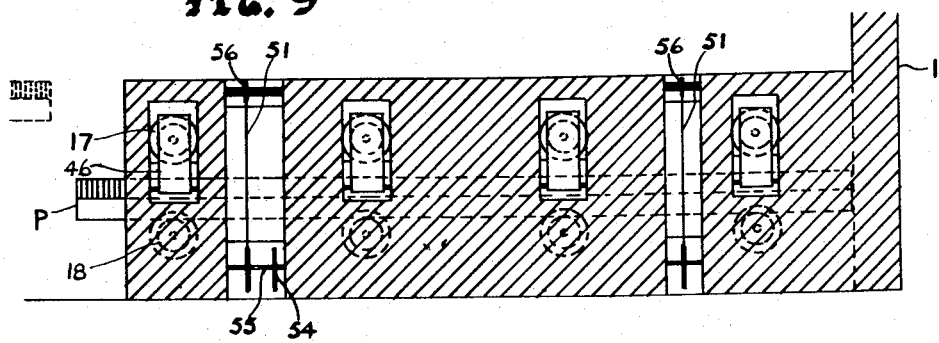
Fig. 9 is a sectional elevation taken on the line 9—9 (Fig. 8).
Figure 10:
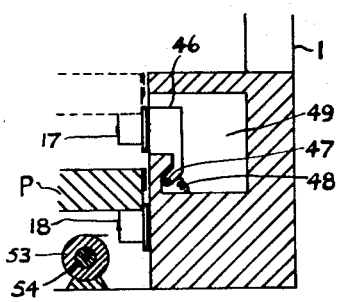
Fig. 10 is a sectional elevation taken on the line 10—10 (Fig. 8).
Figure 11:
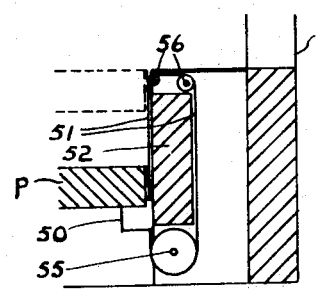
Fig. 11 is a sectional elevation taken on the line 11—11 (Fig. 8).

Referring to the drawings:

The apparatus comprises a building or structure I having a central shaft or well 2. On the one side of the shaft 2 there is a series of superposed compartments $a$ to $e$, and on the other side a series of similar compartments $f$ to $j$. A hoist or lift 3 is provided in the shaft 2, being carried by cables 4 and adapted to run on vertical guides 5. The hoist 3 is operated through the cables 4 by means of an electric motor 6, the drive of which is transmitted through a shaft 7, cables 8, 9, pulleys 10, 11 to the shafts 12, 13 on which the cable pulleys 14, 15 are mounted. The weight of the hoist 3 is counterbalanced by weights 16 attached at the opposite ends of the cables 4.

The floors of the compartments $a$ to $j$ are constituted by platforms $k$ to $t$ respectively. Another platform $u$ is provided on the hoist 3. These platforms are all interchangeable in position as will appear hereinafter.

A platform ($k$ to $t$) may be accommodated in any compartment $a$ to $j$ or in the hoist 3 either in an upper position or a lower position, as provided by upper rollers 17 or lower rollers 18.

For moving the platforms ($k$ to $u$) horizontally on the rollers 17 or 18, I provide on the hoist 3 the operating mechanism illustrated in Figs. 3 to 7.

In these figures, the platform $r$ is shown positioned on the upper rollers 17 of the hoist 3, whilst the platform $u$ is positioned on, or on a level with, the lower rollers 18. The figures also illustrate the guide slides 19, which are mounted on the hoist 3 and bear against the guides 5. Toothed racks 21 are fixed along the two sides of each of the platforms $k$ to $u$ and will be apparent on the platforms $m$, $r$ and $u$ shown in Fig. 3.

The mechanism at each side of the hoist 3 for operating the platforms through the racks 21 comprises a central pair of upper and lower pinions 22, 23, a left-hand pair of upper and lower pinions 24, 25 and a right-hand pair of upper and lower pinions 26, 27. The central pinions 22, 23 have their shafts mounted in the frame 3 of the hoist and are operable through bevel gearing 28, chain-and-sprocket gearing 29 (Figs. 3 and 4), shaft 30 and chain-and-sprocket gearing 31, from an electric motor 32.

The axes of the central pinions 22, 23 are fixed in position relatively to the frame of the hoist 3 and consequently to the path of the toothed racks 21. The axes of the left-hand pinions, 24, 25 and right-hand pinions 26, 27 are not so fixed, but are movable relatively to the frame of the hoist 3, so that either the left-hand pinions 24, 25 or the right-hand pinions 26, 27 can be moved into or out of mesh with the racks 21. For effecting this movement, the pinions 24, 25 and 26, 27 are respectively mounted in carriages 33. Each carriage 33 is connected to hoist 3 by dovetail joints 34 which allows 33 to slide accordingly at right angles to the racks 21 on the platforms. The pinion wheels 24, 25 and 26, 27 are adapted to be moved into or out of the path of the racks 21 according as a platform is or is not to be moved out of a compartment ($a$ to $j$) on to the hoist 3 or vice versa. The necessary advancing or retracting movement of the carriage 33 is effected by means shown in Figs. 3 and 7 consisting of an electric solenoid 36, interconnecting rod 37 and spring 38. The sliding carriage 33 is drawn inwards by solenoid 36 through rod 37. When platforms are in their respective positions, solenoid 36 is de-energised and spring 38 pushes carriage 33 outwards.

The right-hand pinions 26, 27 are driven from the electric motor 32 through the chain-and-sprocket gearing 31, shaft 30, sprocket wheel 41, chain 42 (Fig. 7), sprocket wheel 43 and bevel gearing 44 (Fig. 4). The left-hand pinions 24, 25 are driven from the shaft 30 by similar means. As will be seen from Fig. 4, the upper pinions 24, 26 and the central pinion 22 are all driven in the same direction, whilst the lower pinions 25, 23 and 27 are all driven in the opposite direction. As shown in Fig. 7, the chain 42 meshing with the sprocket wheels 41, 43 also passes round an idler wheel 45.

For moving the platform $p$ from a lower set of rollers 18 to an upper set of rollers 17 at the receiving compartment $f$, I provide the mechanism illustrated in Figs. 8 to 12. This movement is required immediately after a platform occupied by a vehicle or load has been moved off the upper set of rollers in the compartment on to the hoist 3 by the mechanism already referred to in connection with Figs. 3 to 7.

Figure 12:
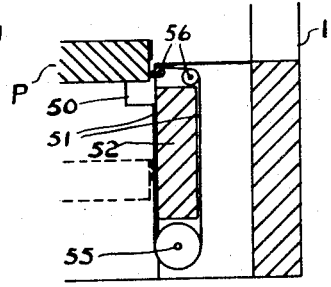
Fig. 12 is a sectional elevation similar to that shown in Fig. 11 but with the platform in its uppermost instead of its lowermost position.
Figure 13:
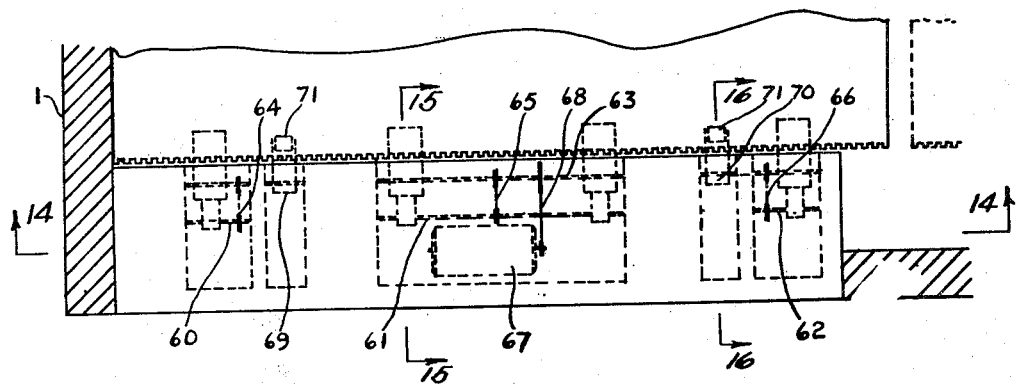
Fig. 13 is a plan view of the means for lowering the platform from the upper set to the lower set of rollers at the delivery compartment.

In Figs. 8 to 12 it will be seen that each upper roller 17 has its axle mounted in a frame 46 (see in particular Fig. 10) which is supported at its lower end on a pivot pin 47. The pivoted frame 46 is normally retained in its vertical position by a spring 48, in which position the frame 46 lies within a rectangular opening 49 in the structure 1. The roller 17, when the frame 46 is vertical, projects inwardly but is free to tilt outwards. For raising the platform $p$ (Figs. 10 to 12) off the rollers 18 on to the rollers 17, lifters 50 (Figs. 8, 11 and 12) are provided. These lifters are each connected to an endless cable 51 and are adapted to be raised and lowered up and down the guiding face 52 on the structure 1. The cables 51 are operated by an electric motor 53 through a shaft 55 (Figs. 9, 11 and 12) and driving pulleys 54. Each cable 51 is supported at the top by idler pulleys 56. The motor 53 is reversible, so that the lifters 50 may be either raised from the bottom position (Fig. 11) or lowered from the top position (Fig. 12).

For moving the platform $k$ from the upper set of rollers 17 to the lower set of rollers 18 on the structure 1, I provide the mechanism illustrated in Figs. 13 to 17. This movement is required after a platform occupied by a vehicle or load has to be moved into the compartment $a$ by the mechanism already referred to in connection with Figs. 3 to 7, the load or vehicle delivered and the compartment to be made ready for the next delivery.

Figure 14:
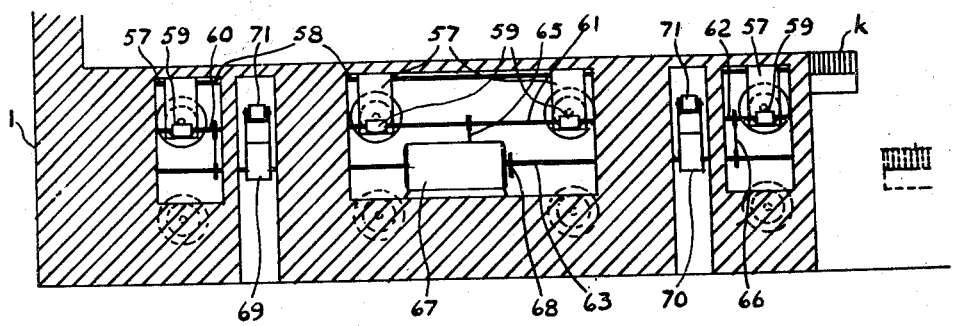
Fig. 14 is a sectional elevation taken on the line 14—14 (Fig. 13).
Figure 15:
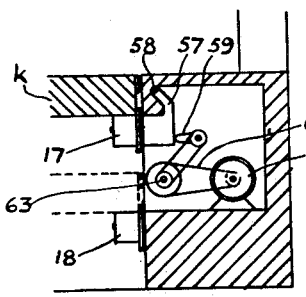
Fig. 15 is a sectional elevation taken on the line 15—15 (Fig. 13).

In Figs. 13 to 17, the platform $k$ of the left-hand lowermost compartment $a$ (Fig. 1) is illustrated. As shown in Figs. 14 and 15, each upper roller 17 has its axle mounted in a frame 57 which is supported at its upper end on a pivot pin 58. The pivoted frame 57 is normally retained in its vertical position by a cam 59. The cams 59 are mounted on shafts 60, 61, 62. (Figs. 13 and 14) which are adapted to be rotated by a shaft 63 through chain-and-sprocket gearing 64, 65, 66. The shaft 63 is driven by an electric motor 67 through chain-and-sprocket gearing 68. As will be seen from Fig. 15, when the frame 57 is held vertical by the cam 59, the upper roller 17 constitutes a steady roller support for the platform k.

Figure 16:
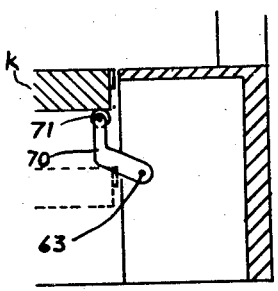
Fig. 16 is a sectional elevation taken on the line 16—16 (Fig. 13).
Figure 17:
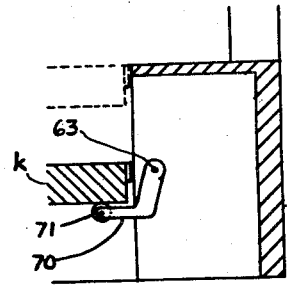
Fig. 17 is a sectional elevation similar to that shown in Fig. 16 but with the platform in its lowermost instead of its uppermost position.

On the shaft 63, there are also fixed two bent levers 69, 70 (see Figs. 14, 16 and 17). The ends of the levers 69, 70 are provided with rollers 71. When the upper rollers 17 are held horizontal by the cams 59 (Fig. 15), the levers 69, 70 are held upwards in the position shown in the case of the levers 70 in Fig. 16. In this position the rollers 71 bear against the under-surface of the platform k. When the upper rollers 17 are released by the cams 59, the rotation of the shaft 63 by the motor 67 to effect this movement simultaneously swings the levers 69, 70 downwards from the position shown in Fig. 16 to the position shown at 70 in Fig. 17. In this position, the platform k rests upon the lower set of rollers 18 (Fig. 15). In practice, the drive of the motor 67 is unidirectional so that the cams 59 and levers 69, 70 continue their anti-clockwise movement (Figs. 15 to 16) to complete one revolution whereby the cams 59 return the frames 57 and rollers 17 to their normal position (Fig. 15) and the levers 69, 70 swing round to their normal position (Fig. 16) ready to receive the next platform to be transferred on to the rollers 17.

The operation of the apparatus above described is as follows:

Assuming, by way of example, that a car has entered the bottom right-hand compartment f (Fig. 1), the hoist 3 is brought down to the same level, i. e. so that its upper rollers 17 are on a level with the upper rollers 17 of the compartment f. The hoist 3 will, it is assumed, be then carrying the platform p on its lower rollers 18. From these rollers, the platform p will be transferred horizontally by means of the mechanism already described with reference to Figs. 3 to 7 on to the lower rollers 18 of the compartment f. For the purpose of this movement, the right-hand solenoid 36 (Figs. 3 and 7) will be operated so as to move the sliding carriage 33 inwards by means of the connecting rod 37. The motor 32 will then be operated so as to rotate the lower pinions 23 and 27. The pinion 23, which is already in engagement with the toothed rack 21 of the platform on the lower rollers 18 of the hoist 3, will drive the said platform horizontally towards the lower rollers 18 of the compartment f, whereupon the toothed rack 21 of the said platform will become engaged also by the lower pinions 27, which will complete the transfer of the platform on to the said rollers. Simultaneously, the platform which is then on the upper rollers 17 of the compartment f will be transferred horizontally to the left on to the upper rollers 17 of the hoist 3. This movement will be effected by the upper pinions 26 (Figs. 3 and 4) which will already have been engaged with the toothed racks 21 of the platform bearing the car as aforesaid. As the movement of the platform is continued to the left, its toothed racks 21 will become engaged by the upper pinions 22 on the hoist 3, and these will continue to move the platform on to the hoist until it is located symmetrically on the hoist.

The hoist 3 is then raised by the motor 6 and cables 4 up to an empty compartment, which, it will be assumed, is compartment h. At this compartment, the hoist 3 is brought to rest, with its rollers 17 and 18 on a level with the rollers 17, 18 of the said compartment.

When the hoist has thus been moved away from the ground floor compartment f, the platform p, which is then resting on the lower rollers 18 of the compartment f, will be raised from these rollers on to the upper rollers 17 by the mechanism already described with reference to Figs. 8 to 12. For the purpose of this movement the motor 53 will be operated so as to cause the lifters 50 (Fig. 11) to be raised through the cable 51. As the platform moves upwards it will push aside the upper rollers 17, the frames 46 carrying these rollers being swung aside against the pressure of the springs 48. The uppermost position of the platform is shown in Fig. 12, and, when the platform has reached this position, the upper rollers 17 and frames 46 will be swung inwards under pressure of the springs 48, so that the rollers assume their normal horizontal inwardly projecting position. The motor 53 will then be operated to permit the platform to subside on to the said rollers 17, when the platform is then ready for the entry of another car.

When the hoist 3 is raised as aforesaid to the compartment h an empty platform u will, it is assumed, be resting on the lower rollers 18 of the compartment h. In order to transfer this platform u on to the lower rollers 18 of the hoist 3, and the occupied platform r on the hoist 3 in the opposite direction on to the upper rollers 17 of the compartment h, the mechanism described with reference to Figs. 3 to 7 is again brought into operation. In effecting this movement, the right-hand solenoid 36 (Figs. 3 and 7) will be operated so as to draw the carriage 33 inwards, and bring the upper and lower pinions 26, 27 into the path of the toothed racks 21 of the upper and lower platforms r, u respectively.

The horizontal transfer of these platforms will then be effected by the rotation of the upper pinions 22, 26 and lower pinions 27, 23 respectively.

When the platform r has been fully transferred to the compartment h and the platform u fully transferred on to the hoist 3, the hoist will be free to travel up or down as required. Whenever the transfer of platforms on to the upper and lower rollers 17 or 18 have been completed, the appropriate solenoid 36 at the left-hand or right-hand end of the hoist, as the case may be, is de-energised and by means of the spring 38, sliding carriage 33 is brought back to its normal position, clear of the path of the toothed racks 21 at the sides of the platforms.

It will be appreciated that the motors 32 (Figs. 3 to 5) for effecting the horizontal transfer of the platforms on to and off the hoist 3 will be reversible, so that platforms can be moved on either the upper rollers 17 or lower rollers 18 either to the left or to the right.

The operation of the apparatus, in order to transfer a car from any of the compartments b, c, d, e, g, h, i, j (Fig. 1) on to the hoist 3 and thence to the left-hand ground compartment a for departure, is the reverse of the operation of receiving a car at the right-hand ground compartment f and transferring it by way of the hoist 3 to one of the upper compartments which is empty, as above described. In Fig. 1, the platform k in the left-hand ground compartment a is normally kept, in empty condition, on the lower rollers 18, so that the occupied platform brought down by the hoist 3 can be transferred at once horizontally on to the upper rollers 17 of the compartment a and thence driven off.

Various modifications may be made in the apparatus described without departing from the scope of the invention. For example, instead of providing two sets of rollers in fixed upper and lower positions in every compartment and on the hoist 3, each platform may itself be provided with rollers along the sides thereof, and the position of the rollers illustrated in the drawings would be taken by runways, the upper runways being capable of being turned aside to permit a platform being raised or lowered past them. Moreover, although in the foregoing description of the operation of the apparatus, the compartments a and f have been regarded as reception and departure compartments respectively, it will be appreciated that both compartments may be arranged to be used if desired for either entry or departure.

As a further modification, instead of the vehicles or loads being first received and eventually driven or taken off either of the ground compartments (a or f), the vehicles or loads may be first received and finally driven off or removed from a platform on the hoist 3 direct. The ground compartments a and f would then function as storage or parking compartments in the same manner as the upper compartments b to j.

I claim:

1. Apparatus of the character described comprising, in combination, a series of superposed parking compartments constituted within a framework, a transfer shaft provided in adjacency to said series of compartments and accessible thereto, a hoist arranged for movement in said shaft, vertically spaced platform supporting means at the level of each compartment, similarly vertically spaced platform supporting means on said hoist, means for moving said hoist within said transfer shaft so that the spaced platform supporting means thereof may selectively be brought into alignment with the platform supporting means of any compartment, a platform on the supporting means of each compartment and of said hoist, and means for moving the platform of said hoist horizontally onto juxtaposed aligned platform supporting means of a compartment and vice versa, and for moving the platform of the latter horizontally onto the aligned platform supporting means of said hoist and vice versa.

2. Apparatus of the character described comprising, in combination, a series of superposed parking compartments constituted within a framework, a transfer shaft provided in adjacency to said series of compartments and accessible thereto, a hoist arranged for movement in said shaft, vertically spaced platform supporting means at the level of each compartment, similarly vertically spaced platform supporting means on said hoist, the vertically spaced platform supporting means of the several compartments and of the hoist comprising an upper set of supporting rollers and a lower set of supportring rollers, means for moving said hoist within said transfer shaft so that the spaced platform supporting means thereof may selectively be brought into alignment with the platform supporting means of any compartment, a platform on the supporting means of each compartment and of said hoist, means for transferring the platform of a compartment from its lower set of rollers to its upper set of rollers and vice versa, and means for moving the platform of said hoist horizontally onto juxtaposed aligned platform supporting means of a compartment and vice versa, and for moving the platform of the latter horizontally onto the aligned platform supporting means of said hoist and vice versa.

3. Apparatus according to claim 1, and electrically actuated means for moving said hoist and for moving the said platforms.

4. Apparatus according to claim 1, in which the means for moving the platforms horizontally comprises toothed racks fixed along the sides of the platforms, power-operated pinions provided on the hoist for cooperation with the said toothed racks, the pinions being pivotally mounted for movement out of the path of the racks to avoid collision between the pinions and the racks of stationary platforms during travel of the hoist.

5. Apparatus according to claim 2, in which the means for moving a platform from a lower set of rollers to an upper set of rollers comprises a plurality of cable-operated lifters for lifting a platform from the lower rollers up past the upper rollers, said upper rollers being carried on swing frames.

6. Apparatus according to claim 2, in which the means for moving a platform from an upper set of rollers to a lower set of rollers comprises swing levers operable so as to be brought underneath the corners of the platform and to lower the same down past the upper rollers on to the lower rollers, pivotal frames carrying the upper rollers, rotatable cams normally holding said upper rollers in horizontal supporting position, and means for rotating said cams in synchronism with said swing levers, whereby said rollers may be released from said horizontal supporting position.

MARTIN RICKLAND.